United States Patent [19]

Ward

[11] 4,069,027

[45] Jan. 17, 1978

[54] METHOD OF SEPARATING AN ENTRAINED MIST FROM A VAPOR

[75] Inventor: Charles Spurgeon Ward, Columbia, S.C.

[73] Assignee: Allied Chemical Corporation, Morris Township, N.J.

[21] Appl. No.: 686,430

[22] Filed: May 14, 1976

[51] Int. Cl.² .............................................. B01D 47/02
[52] U.S. Cl. ........................................ 55/95; 55/256; 55/270; 261/124
[58] Field of Search ................... 55/95, 255, 256, 244, 55/270, 257 R, 245–247; 261/122, 124, 121 R

[56] References Cited

U.S. PATENT DOCUMENTS

| 1,001,094 | 8/1911 | Torchiani | 55/255 |
| 1,465,397 | 8/1923 | Johnston | 261/121 R |
| 2,000,443 | 5/1935 | Hechenbleikner | 261/121 R |
| 2,485,835 | 10/1949 | Macbeth | 261/121 R |
| 2,920,946 | 1/1960 | Weaver et al. | 261/121 R |
| 3,081,289 | 3/1963 | Cheney et al. | 261/123 |
| 3,231,252 | 1/1966 | Reed | 261/124 |
| 3,815,328 | 6/1974 | Moss | 55/95 |

FOREIGN PATENT DOCUMENTS

| 1,006,412 | 4/1952 | France | 55/256 |

Primary Examiner—Frank W. Lutter
Assistant Examiner—David L. Lacey
Attorney, Agent, or Firm—Richard A. Anderson

[57] ABSTRACT

This invention is a method to remove entrained mist from vapor comprising passing the vapor through a U-shaped conduit, having downward facing slots, then through a liquid to remove the mist and taking the vapor overhead from the liquid and drawing off the excess liquid containing the removed mist.

2 Claims, 4 Drawing Figures (COVER REMOVED)

METHOD OF SEPARATING AN ENTRAINED MIST FROM A VAPOR

BACKGROUND OF THE INVENTION

This invention relates to a method and apparatus to remove entrained mist from a flowing vapor, more specifically, a method and apparatus to remove the mist in a flowing vapor from a vacuum pump. The specific problem is the removal of entrained oil-water mists from water vapor exiting the vacuum pump which exhausts the vapors from a rotary dryer used to dry nylon pellets. This invention has solved a long standing problem and is the result of 14 years of search and trials of various and sundry methods and equipment. Many thousands of dollars has been expended in this search. Until the method and apparatus of this invention, all other trails had proved unsuccessful for one reason or another.

SUMMARY OF THE INVENTION

The method of this invention is to remove entrained mists from flowing vapor. The method consists of passing the vapor through a U-shaped conduit having downward facing slots cut therein, with the vapor entering the conduit near the center of the "U", then exiting the vapor from the slots through a liquid to remove the mist and the vapor, and taking the vapor overhead from the liquid. The liquid containing the removed mist is drawn off. The slots can be any system of multiple slots along the underside of the U-shaped conduit running either parallel to or normal to the axis of the conduit. The slot can be parallel to the axis of the conduit in one or more rows and about $\frac{1}{4}$ inches to about 1-$\frac{1}{2}$ inches long spaced on about $\frac{1}{2}$ inches to about 2-$\frac{1}{2}$ inches centers. In an even more preferred embodiment, the slots are normal to the axis of the conduit spaced on about $\frac{1}{2}$ inches to 2-$\frac{1}{2}$ inches centers and extending from about 80° to about 180°, preferably from about 90° to about 150° of the circumference of a circular conduit and centered at the bottom of the conduit. In actual use, the slots extended 120° on one inch centers. The depth of the liquid which removes the mist from the vapor can be any depth which is operable to permit the vapor to flow. In a preferred embodiment, the liquid could vary from 3 to 15 inches and even more preferably from 6 to 12 inches of liquid extending above the "U"-shaped conduit. The liquid can be water or any other material which will remove the mist from the vapor.

The apparatus of this invention removes entrained mist from flowing vapor containing the mist. The apparatus comprises a chamber containing a liquid, a U-shaped conduit having downward facing slots cut therein, with the U-shaped conduit having an entrance for the vapor near the center of the "U", the chamber having an overhead outlet for the vapor and also having a lateral outlet for liquid overflow, with the chamber having an opening to receive a conduit communicating with the entrance for the vapor in the U-shaped conduit, the opening being sealed around the communicating conduit and the U-shaped conduit being placed near the bottom of the chamber with the slots facing downward with the liquid contained in the chamber covering the U-shaped conduit so that the vapor passes through the U-shaped conduit, exits downwardly into the liquid and the mist is removed from the vapor. The excess of the liquid which removes the mist is drawn off through the lateral outlet, and the vapor exits from the overhead outlet.

The use of this invention will remove, by condensation or entrapment or whatever physical-chemical mechanism takes place, approximately 20 gallons per 24 hour operating day. This data is based on vapor from a vacuum pump which draws the vapor from a rotary dryer for nylon 6 pellets in a commercial operation. The liquid drawn off was found containing 0.2 percent by weight of oil, and a visual analysis shows polymer dust particles. The liquid also contains some unreacted monomer from the polymer chips, but the vast majority of the liquid is water condensate.

Formerly the vapor from the dryer vacuum pumps exhausted directly into the atmosphere, so that installation of the mist separators of this invention will decrease environmental pollution.

DESCRIPTION OF THE PREFERRED EMBODIMENTS

Figure 1:
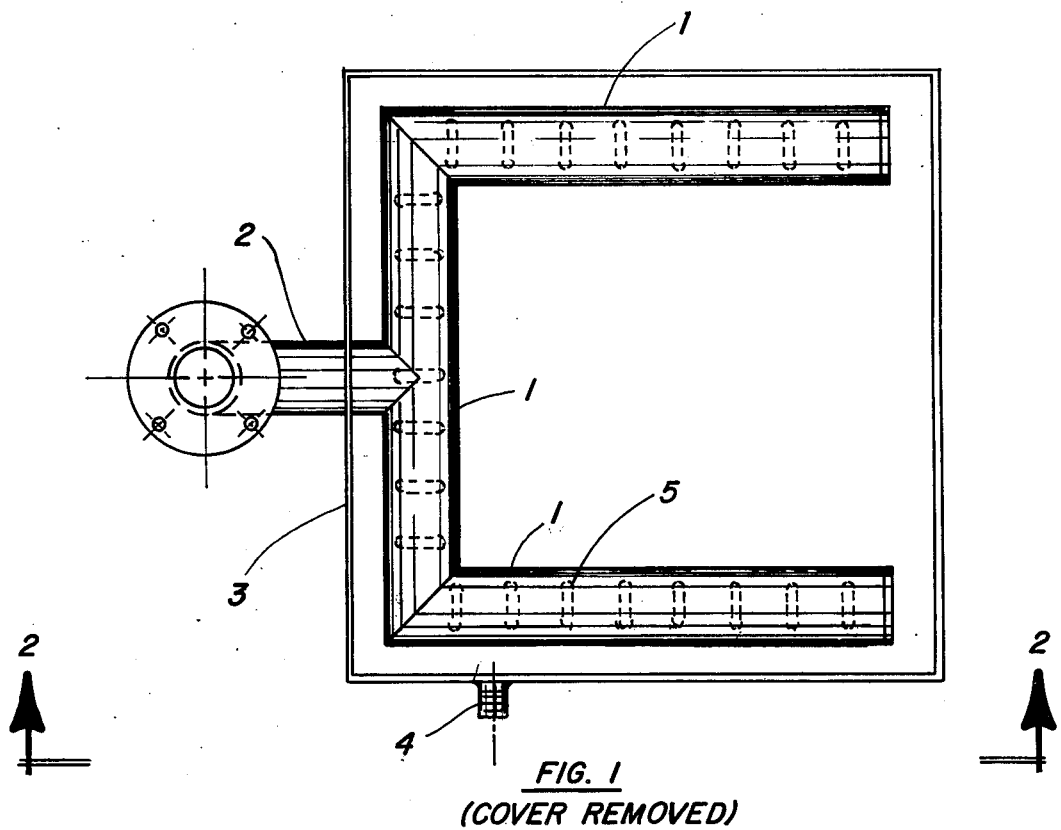
FIG. 1 is a plan view of the mist separator of this invention with the cover removed.

FIG. 1 is a plan view of the mist separator apparatus with the cover removed. U-shaped conduit 1 is shown in place at the bottom of the chamber 3 with entrance conduit 2 communicating with U-shaped conduit 1 near the center of the base of the U-shaped conduit 1, and downward facing slots 5 as shown. The opening where entrance conduit 2 enters chamber 3 is sealed to be water-tight. Chamber 3 also has liquid outflow outlet 4.

Figure 2:
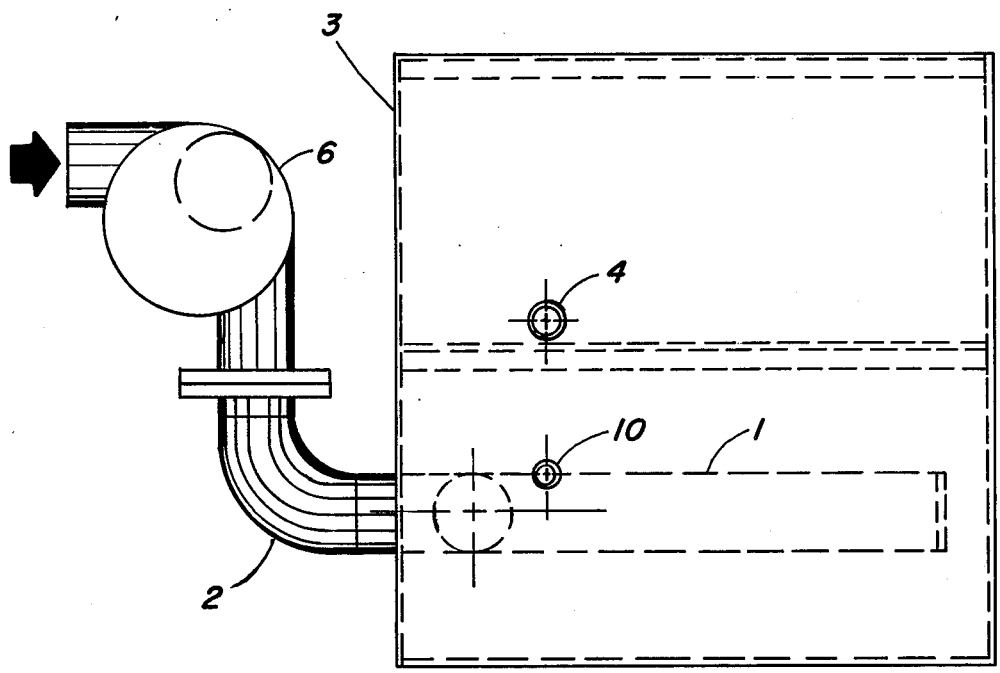
FIG. 2 is a side elevation view of the mist separator of this invention.

FIG. 2 is a side elevation view of the mist separator apparatus of this invention. U-shaped conduit 1 is shown in place at the bottom of chamber 3 connecting with entrance conduit 2 which takes exhaust from vacuum pump 6. Chamber 3 also has liquid outlet 4 and sample outlet 10.

Figure 3A:
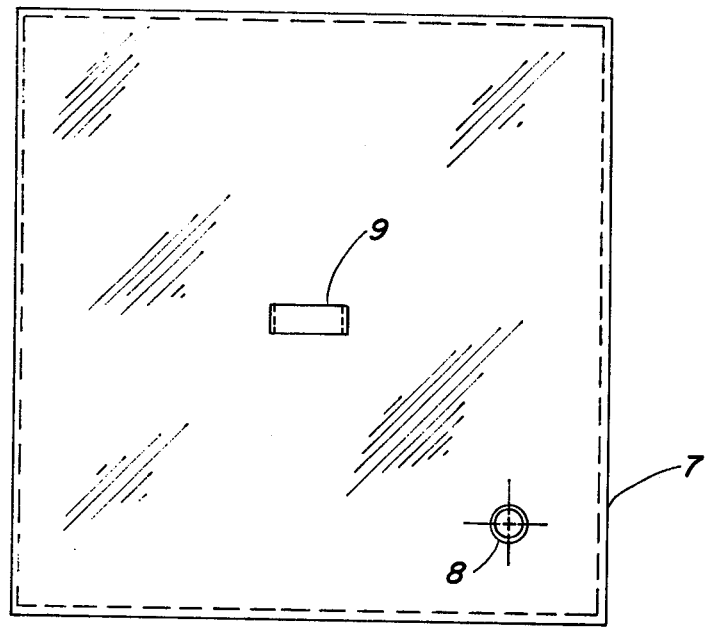
FIG. 3a is a top plan view of the cover.

FIG. 3a shows a plan view of the cover 7 in place on chamber 3. Cover 7 has handle 9 and overhead outlet 8.

Figure 3B:
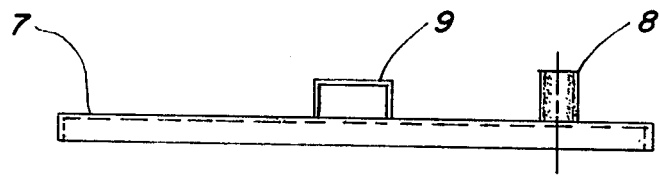
FIG. 3b is the elevation view of the cover.

FIG. 3b shows side elevation of cover 7 having handle 9 and overhead outlet 8.

In operation, vapor from vacuum pump 6 containing entrained mist flows through entrance conduit 2 entering U-shaped conduit 1 near the center of the "U". Vapor flows through U-shaped conduit 1 and exits through downward facing slots 5 through a liquid in chamber 3. The liquid removes the mist from the vapor. The vapor then exits overhead through overhead outlet 8 and excess liquid containing the removed mist is drawn off through liquid outlet 4. Samples can be taken from sample outlet 10 of the liquid in chamber 3. The liquid can be water or any other liquid operable to remove mist of water and oil in the vapors.

The U-shaped conduit is shown in place in the preferred horizontal position but could be angled or biased away from the horizontal and still be operable.

I claim:

1. A method to remove entrained mist from flowing vapor containing said mist by passing said vapor through a liquid, consisting of passing said vapor through a U-shaped conduit positioned in said liquid and having slots cut therein, facing downward from the surface of said liquid, said vapor entering said conduit near the center of the base of said U-shaped conduit, then exiting said vapor from said slots through said liquid to remove said mist from said vapor, then withdrawing said vapor overhead from said liquid, and drawing off said liquid containing said removed mist, said liquid extending to a level 3 to 15 inches above said U-shaped conduit, and said slots being spaced at about ½-inch to about 2-½-inch centers along said U-shaped conduit and having an axis normal to the axis of said U-shaped conduit.

2. The method of claim 1 wherein said liquid is water and extends from 6 to about 12 inches above said U-shaped conduit.

* * * * *